United States Patent
Matsuura

(10) Patent No.: US 6,910,909 B2
(45) Date of Patent: Jun. 28, 2005

(54) WIRING ARRANGEMENT FOR VEHICLE EXTERIOR COMPONENT

(75) Inventor: Masaaki Matsuura, Fujieda (JP)

(73) Assignee: Murakami Corporation, Shizuoka (JP)

( * ) Notice: Subject to any disclaimer, the term of this patent is extended or adjusted under 35 U.S.C. 154(b) by 0 days.

(21) Appl. No.: 10/721,546

(22) Filed: Nov. 26, 2003

(65) Prior Publication Data

US 2004/0171281 A1 Sep. 2, 2004

(30) Foreign Application Priority Data

Feb. 28, 2003 (JP) ........................................ 2003-052461

(51) Int. Cl.⁷ ............................................ H01R 13/627
(52) U.S. Cl. ...................................... 439/342; 307/10.1
(58) Field of Search .................. 439/34, 362; 362/80.1, 362/368; 340/687, 667; 307/10.1

(56) References Cited

U.S. PATENT DOCUMENTS

| | | | |
|---|---|---|---|
| 2,312,300 A | | 2/1943 | Baerwald |
| 3,265,878 A | | 8/1966 | Talbot |
| 3,737,849 A | * | 6/1973 | Mead ...................... 340/457.1 |
| 5,289,353 A | | 2/1994 | Sasajima et al. |
| 5,791,936 A | * | 8/1998 | Nicholson ................... 439/521 |
| 6,357,101 B1 | * | 3/2002 | Sarh et al. ............... 29/407.09 |
| 6,575,039 B2 | * | 6/2003 | Murai et al. .................... 73/756 |
| 6,784,803 B1 | * | 8/2004 | Hypke et al. ................ 340/687 |
| 6,809,512 B2 | * | 10/2004 | Pfaffenberger et al. .. 324/207.2 |

FOREIGN PATENT DOCUMENTS

| | | |
|---|---|---|
| DE | 36 06 004 | 8/1987 |
| DE | 40 26 945 | 3/1992 |
| JP | 7-8086 | 2/1995 |

OTHER PUBLICATIONS

M. Barth, Auto & Elektronik, no. 4, XP-002285974, pp. 10–12 and 14, "Lin–Bus Gesteuertes Smart–Power–Chip" 2000.

J. V. Denuto, et al., SAE Technical Paper Series, XP-002285975, pp. 1–9 "Lin Bus and Its Potential for Use in Distributed Multiplex Applications", Mar. 5–8, 2001.

P. Steiner, et al., Elektronik Im Kraftfahrzeug, XP-002285976, pp. 1103–1114, "Requirements and System Architecture of Future Body Electronics", Sep. 27, 2001 (with English Abstract).

\* cited by examiner

Primary Examiner—J. F. Duverne
(74) Attorney, Agent, or Firm—Oblon, Spivak, McClelland, Maier & Neustadt, P.C.

(57) ABSTRACT

A door mirror 5 as a vehicle exterior component is fixed by three bolt-nut pairs 1–3 to a mount 4A of a vehicle body 4, and secure electric connection is established via the bolt-nut pairs 1–3 between an ignition switch circuit in the vehicle body and electric parts, such as a driving motor, a mirror angle adjustment circuit and a mirror retracting/deploying operation circuit, incorporated in the door mirror 5. Thus, a defect in electric connectivity (e.g., a break and a short circuit) to the electric part can be prevented, and the number of assembly steps, and thus man-hours for assembly, of the vehicle exterior component can be reduced.

13 Claims, 4 Drawing Sheets

WIRING ARRANGEMENT FOR VEHICLE EXTERIOR COMPONENT

BACKGROUND OF THE INVENTION

This invention relates to a wiring arrangement for a vehicle exterior component including an electric part.

There are various kinds of exterior components fixed to a vehicle body of an automobile, among which is an electrically operated retractable door mirror. The electrically operated retractable door mirror incorporates a motor circuit for adjusting a mirror angle, a motor circuit for retracting and deploying a mirror body, and the like. Typically, the door mirror is fixed on an outer surface of the vehicle body with two or three of bolt-nut pairs, while the motor circuit or the like incorporated in the door mirror is connected via a wiring harness to a feeder circuit, a switch circuit or the like equipped in the vehicle body.

In recent years, the door mirror has been becoming multi-functional by incorporating a variety of electric parts and electric circuits such as a turn signal lamp, a foot light, a microphone, a speaker, and an antenna circuit, thus tends to have an increased number of wires in the wiring harness for connecting to the circuits in the vehicle body.

However, the increase in the number of wires in the wiring harness would add cumbersome tasks for wiring; thus proposed in Japanese Laid-Open Utility Model Application, Publication No. 7-8086 was a technique for making it possible to transmit various kinds of operating signals to a variety of the electric parts in the door mirror without requiring increased number of wires in the wiring harness.

This technique uses a signal converter circuit provided in the vehicle body to convert the operating signals of various kinds into signals each having a unique frequency which are in turn transmitted over a single wire into the door mirror in which the signals are restored by a reverse signal converter circuit and transmitted to the electric parts of various kinds.

Conventional techniques for connecting the electric parts or electric circuits incorporated in the door mirror to the feeder circuit, switch circuit or the like equipped in the vehicle body, including the technique disclosed in Japanese Laid-Open Utility Model Application, Publication No. 7-8086, requires a wiring harness and a connector therefor. Accordingly, upon attachment of the door mirror to the vehicle body, the wiring harness could possibly be pinched between the door mirror and the vehicle body. This would disadvantageously cause a defect in electric connectivity such as a break or short circuit in the wiring harness, making it difficult to ensure stable quality of a door mirror system.

Another disadvantage in the conventional techniques lies in cumbersome tasks for the wiring harness, which would increase the number of assembly steps (i.e., man-powers for assembly) of the door mirror, thus raising the assembly cost.

The present invention has been made to address the above-described disadvantages, and provides a wiring arrangement for a vehicle exterior component (e.g., a door mirror) which can prevent a defect in electric connectivity to an electric part incorporated in the vehicle exterior component, and which can reduce the number of assembly steps (i.e., man-hours for assembly) of the vehicle exterior component.

SUMMARY OF THE INVENTION

In one aspect of the present invention, there is provided a wiring arrangement for a vehicle exterior component fixed to a vehicle body by at least two bolt-nut pairs, wherein an electric part incorporated in the vehicle exterior component is connected via the bolt-nut pairs to an electric circuit in the vehicle body.

With the above wiring arrangement, only fixing the vehicle exterior component to the vehicle body serves to securely connect the electric part incorporated in the vehicle exterior component to the electric circuit in the vehicle body, so that a defect in electric connectivity to the electric part that could otherwise occur can be prevented, and the number of assembly steps, and thus man-hours for assembly, of the vehicle exterior component can be reduced.

In the above inventive wiring arrangement for a vehicle exterior component, the at least two bolt-nut pairs may preferably include a first bolt-nut pair and a second bolt-nut pair, such that the electric part is connected via the first bolt-nut pair to one of an ACC terminal and an IG terminal of an ignition switch circuit in the vehicle body, and via the second bolt-nut pair to a GND terminal of the ignition switch circuit. In this configuration, the electric part is supplied with power and actuated when the ignition switch is turned to an "ACC" position or "IG" position.

Moreover, when a signal converter circuit for converting an operating signal transmitted to the electric part into a signal having a unique frequency is provided in the vehicle body, and a reverse signal converter circuit for restoring a frequency signal transmitted from the signal converter circuit to the operating signal and transmitting the same to a circuit in the electric part is incorporated in the vehicle exterior component, the signal converter circuit and the reverse signal converter circuit may preferably be connected via one of the above first bolt-nut pair and another (third) bolt-nut pair. In this configuration, the electric part supplied with power when the ignition switch is turned to an "ACC" position or "IG" position is actuated in accordance with an operating signal received via the third bolt-nut pair.

Further, preferably, a mount for fixing the vehicle exterior component to the vehicle body may be made of an insulating material, and surfaces of the bolt-nut pairs other than a portion for establishing electrical connection may be made electrically insulated. In this configuration, advantageously, a short circuit on establishing electric connection to the electric part can be prevented, and undesirable pickup of noises in the operating signal to be transmitted to the electric part can be prevented.

The above-described wiring arrangement for a vehicle exterior component according to the present invention may be applied to a door mirror in which a motor-driven circuit including at least one of a mirror angle adjustment circuit and a mirror retracting/deploying operation circuit is incorporated, and to a rear spoiler in which a high mount stop lamp is incorporated. The present invention as described above may be embodied in any other vehicle exterior components including one or more of electric parts and fixed to the vehicle body by two or more bolt-nut pairs.

Other advantages and further features of the present invention will become readily apparent from the following description of preferred embodiments with reference to accompanying drawings.

DETAILED DESCRIPTION OF THE PREFERRED EMBODIMENTS

A detailed description will be given of one exemplified embodiment of a wiring arrangement for a vehicle exterior component according to the present invention with reference to FIGS. 1 through 3.

Figure 1:
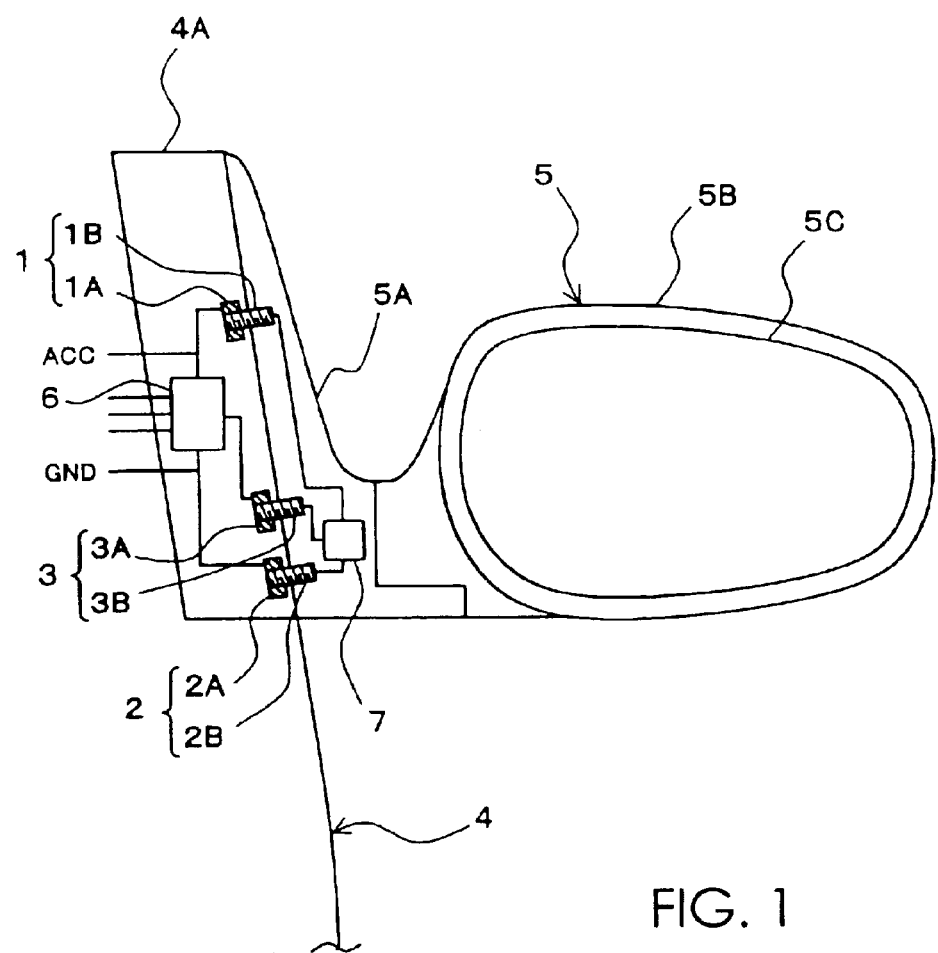
FIG. 1 is a front elevation of a schematically illustrated door mirror as one exemplified embodiment of a wiring arrangement for a vehicle exterior component according to the present invention.

The wiring arrangement for a vehicle exterior component according to this embodiment, as shown in FIG. 1, is applied to a door mirror 5 fixed onto an outer surface of a vehicle body 4 by three bolt-nut pairs: a first bolt-nut pair 1, a second bolt-nut pair 2 and a third bolt-nut pair 3. The door mirror 5 includes a mirror base 5A, a mirror body 5B, and a reflector 5C. The mirror base 5A is fixed to a mount 4A provided in the vehicle body 4 by the three bolt-nut pairs 1–3. The mirror body 5B is swingably supported on the mirror base 5A so that the mirror body 5B can swing between an operative position where the mirror body 5A protrudes from the vehicle body 4 to an outside thereof, and a retracted position where the mirror body 5A folds flat along the outer surface of the vehicle body 4. The reflector 5C is fitted in the mirror body 5A in a manner that permits an angle thereof to be adjusted appropriately;

The mount 4A in the vehicle body 4 is formed of electrically insulating plastic. In the mount 4A are formed (e.g., inserted) three nuts 1A–3A constituting the mates to three bolts 1B–3B of the bolt-nut pairs 1–3 and wiring for connecting the nuts 1A–3A to a signal converter circuit 6. The signal converter circuit 6 may be fitted in the mount 4A or installed in other locations of the vehicle body 4.

On the other hand, the mirror base 5A and the mirror body 5B of the door mirror 5 as well are formed of electrically insulating plastic. In the mirror base 5A are formed (e.g., inserted) three bolts 1B–3B constituting the counterparts of the nuts 1A–3A of the bolt-nut pairs 1–3, and wiring for connecting the bolts 1B–3B to a reverse signal converter circuit 7. The reverse signal converter circuit 7 may be fitted in the mirror base 5A or installed in other locations of the door mirror 5.

Figure 2:
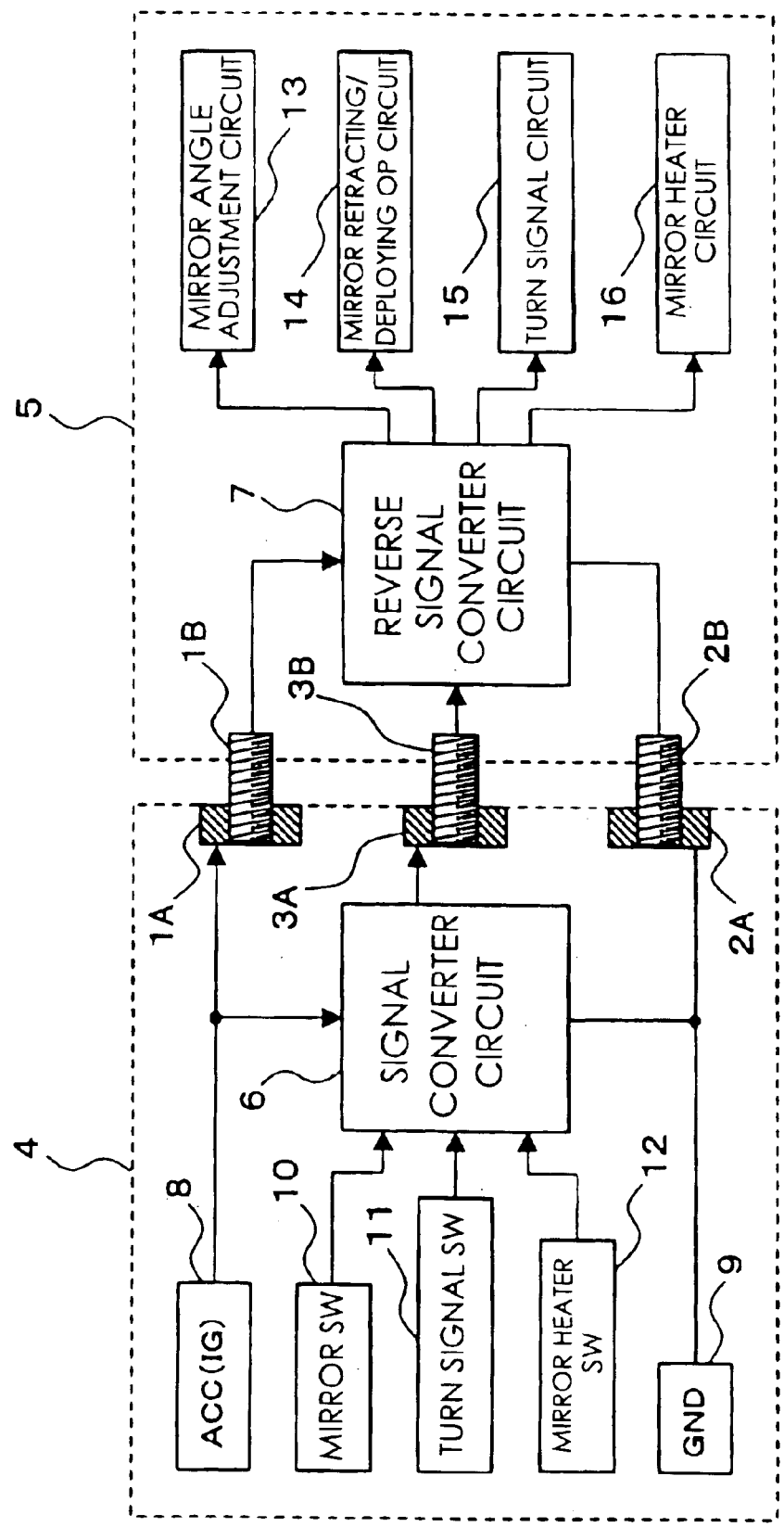
FIG. 2 is an electric circuit diagram in a door mirror and a vehicle body between which electric connection is established via three bolt-nut pairs illustrated in FIG. 1.
Figure 3:
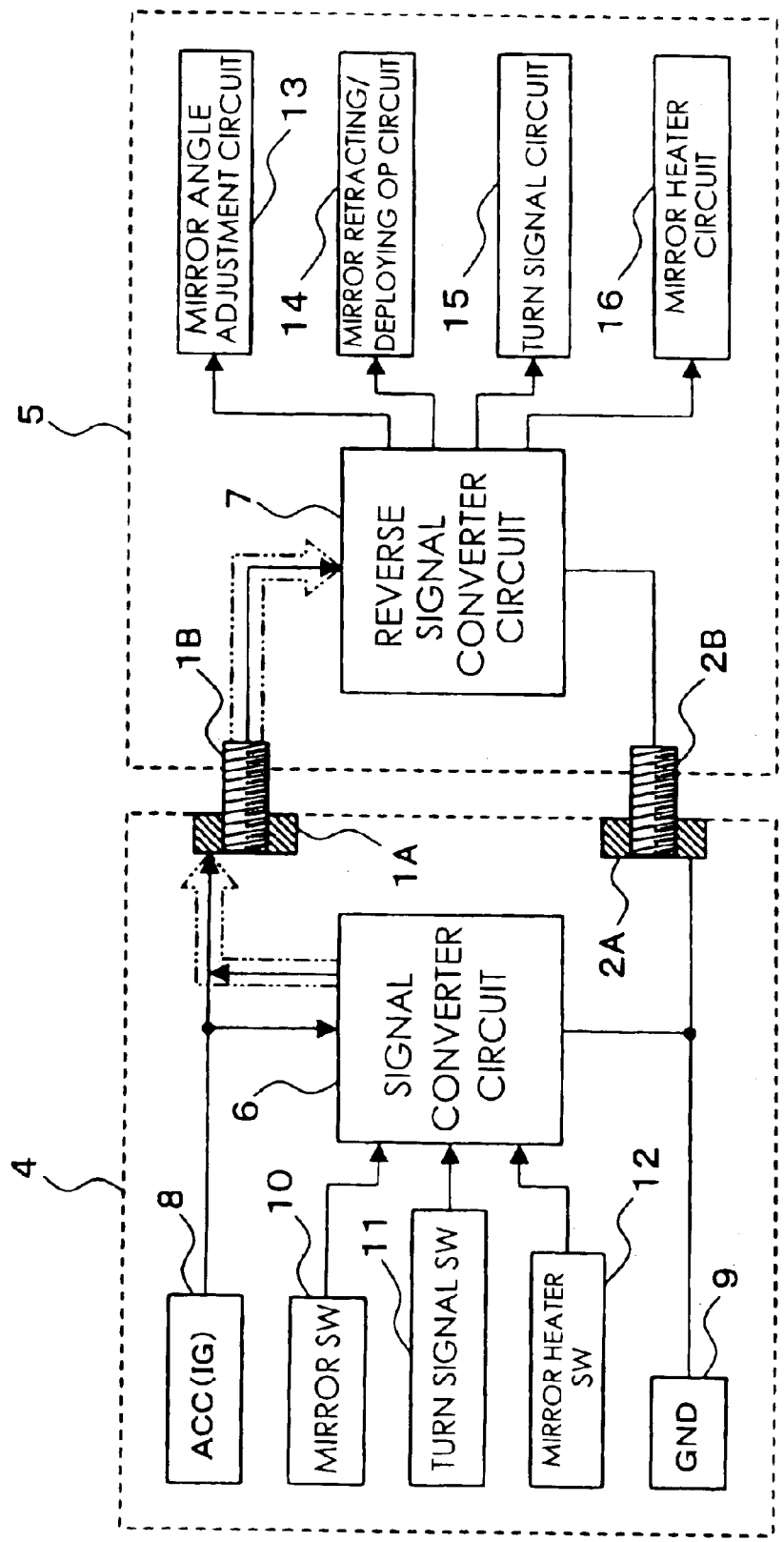
FIG. 3 is an electric circuit diagram in a door mirror and a vehicle body between which electric connection is established via two bolt-nut pairs among three bolt-nut pairs illustrated in FIG. 1.

As shown in FIG. 2, in the vehicle body 4, an ACC (IG) terminal 8 of an ignition switch circuit is connected to the nut 1A and a positive terminal of the signal converter circuit 6 in the mount 4A, while a negative terminal of the signal converter circuit 6 and the nut 2A are connected to a GND terminal 9 of the ignition switch circuit. Input terminals of the signal converter circuit 6 are each connected respectively to output terminals of a mirror switch 10, a turn signal switch 11 and a mirror heater switch 12 each provided in an instrument panel (not shown). An output terminal of the signal converter circuit 6 is connected to the nut 3A.

On the other hand, in the door mirror 5, the bolt 1B is connected to a positive terminal of the reverse signal converter circuit 7 in the mirror base 5A, while a negative terminal of the reverse signal converter circuit 7 is connected to the bolt 2B. Output terminals of the reverse signal converter 7 are each connected respectively to a mirror angle adjustment circuit 13, a mirror retracting/deploying operation circuit 14, a turn signal circuit 15 and a mirror heater circuit 16 each provided in the mirror body 5B.

The mirror switch 10 is a switch for transmitting a predetermined operating signal generated in accordance with a manual operation to the mirror angle adjustment circuit 13 and the mirror retracting/deploying operation circuit 14. The mirror angle adjustment circuit 13 controls a motor for adjustment (not shown) incorporated in the mirror body 5B to adjust the angle of the reflector 5C upward, downward, rightward and leftward. The mirror retracting/deploying operation circuit 14 controls a motor for retracting/deploying operation (not shown) incorporated in the mirror body 5B to swing the mirror body 5B to the operative position or to the retracted position.

The turn signal switch 11 is a switch for transmitting a predetermined operating signal generated in accordance with an operation of a blinker to the turn signal circuit 15. The turn signal circuit 15 that has received the operating signal from the turn signal switch 11 actuates a blinker (not shown) attached to the mirror body 5B to flash on and off.

The mirror heater switch 12 is a switch for transmitting a predetermined operating signal generated in accordance with a manual operation to the mirror heater circuit 16. The mirror heater circuit 16 activates a mirror heater (not shown) incorporated in the mirror body 5B to heat the reflector 5C so as to remove raindrops, dew, frost, accreting ice, etc. forming on the reflector 5C.

The signal converter circuit 6 converts the predetermined operating signals transmitted from the mirror switch 10, the turn signal switch 11 and the mirror heater switch 12 into an analog signal as a combination of predetermined unique frequencies, and outputs the analog signal via the nut 3A and the bolt 3B of the third bolt-nut pair 3 to the reverse signal converter circuit 7 for a predetermined period of time. The analog signal is, for example, a dual tone multiple frequency (DTMF) signal.

The reverse signal converter circuit 7 receives the DTMF analog signal transmitted from the signal converter circuit 6 for a predetermined period of time, and reversely converts the DTMF analog signal into the predetermined operating signals having frequency components derived from the mirror switch 10, the turn signal switch 11 and the mirror heater switch 12. The predetermined operating signals restored (reversely converted) by the reverse signal converter circuit 7 are transmitted to the mirror angle adjustment circuit 13, the mirror retracting/deploying operation circuit 14, the turn signal circuit 15 and the mirror heater circuit 16, respectively.

In order to prevent undesirable pickup of noises in the operating signals to be transmitted from the switches provided in the vehicle body 4 to the mirror angle adjustment circuit 13, the mirror retracting/deploying operation circuit 14, the turn signal circuit 15 and the mirror heater circuit 16 each provided in the door mirror 5, and to prevent a short circuit upon establishing electric connection between the vehicle body 4 and the door mirror 5, all the surfaces of the nuts 1A–3A other than portions for establishing electrical connection (e.g., portions to which wires are soldered) are electrically insulated (e.g., coated with insulator). The bolts 1B–3B are inserted in the mirror base 5A, and thus the surfaces thereof other than a portion for establishing electrical connection (e.g., portions to which wires are soldered) are made electrically insulated.

Although FIG. 1 illustrates only the right door mirror 5 fixed onto the right side of the vehicle body 4, it is understood that a left door mirror similar to the right door mirror 5 is fixed onto the left side of the vehicle body by three (first, second and third) bolt-nut pairs in a like manner.

According to the present embodiment of the wiring arrangement for a vehicle exterior component as thus described above, the mirror body 5B of the door mirror 5 is fixed to the mount 4A of the vehicle body 4 by the first bolt-nut pair 1, the second bolt-nut pair 2, and the third bolt-nut pair 3, as shown in FIGS. 1 and 2. The ACC (IG) terminal 8 of the ignition switch in the vehicle body 4 is connected via the first bolt-nut pair 1 to the positive terminal of the reverse signal converter circuit 7 in the mirror body 5B, the GND terminal 9 in the vehicle body 4 is connected via the second bolt-nut pair 2 to the negative terminal of the reverse signal converter circuit 7 in the mirror body 5B, and the output terminal of the signal converter circuit 6 in the mount 4A is connected via the third bolt-nut pair 3 to the input terminal of the reverse signal converter circuit 7 in the mirror body 5B. Therefore, when the ignition switch is turned to the ACC position or the IG position, the reverse signal converter circuit 7, the mirror angle adjustment circuit 13, the mirror retracting/deploying operation circuit 14, the turn signal circuit 15, the mirror heater circuit 16 and other circuits (not shown) in the door mirror 5 are securely supplied with power and actuated without fail.

In conclusion, The conventional wiring arrangement using a multi-cable wiring harness could possibly allow the wiring harness to be pinched between the door mirror and the vehicle body upon installation of the door mirror, causing a defect in electric connectivity such as a break or short circuit in the wiring harness, and would involve cumbersome wiring tasks for the wiring harness, which would increase the number of assembly steps (i.e., man-hours for assembly) of the door mirror, thus raising the assembly cost. In contrast, the wiring arrangement according to the present embodiment can prevent such a defect in electric connectivity (e.g., a break and short circuit), and can reduce the number of assembly steps or man-hours for assembly of the door mirror 5.

The present invention is not limited to the above-described embodiments, and the wiring arrangement for a vehicle exterior component according to the present invention can be modified as appropriate and embodied with variations. For example, as shown in FIG. 3, without using the third bolt-nut pair 3, the output terminal of the signal converter circuit 6 in the vehicle body 4 may be connected to the nut 1A while the input terminal of the reverse signal converter circuit 7 in the door mirror 5 may also be used as the positive terminal thereof. In this configuration, the analog signal converted by the signal converter circuit 6 is transmitted via the nut 1A and the bolt 1B to the input terminal commonly used as the positive terminal, as indicated by a chain double-dashed arrow in FIG. 3.

Figure 4:
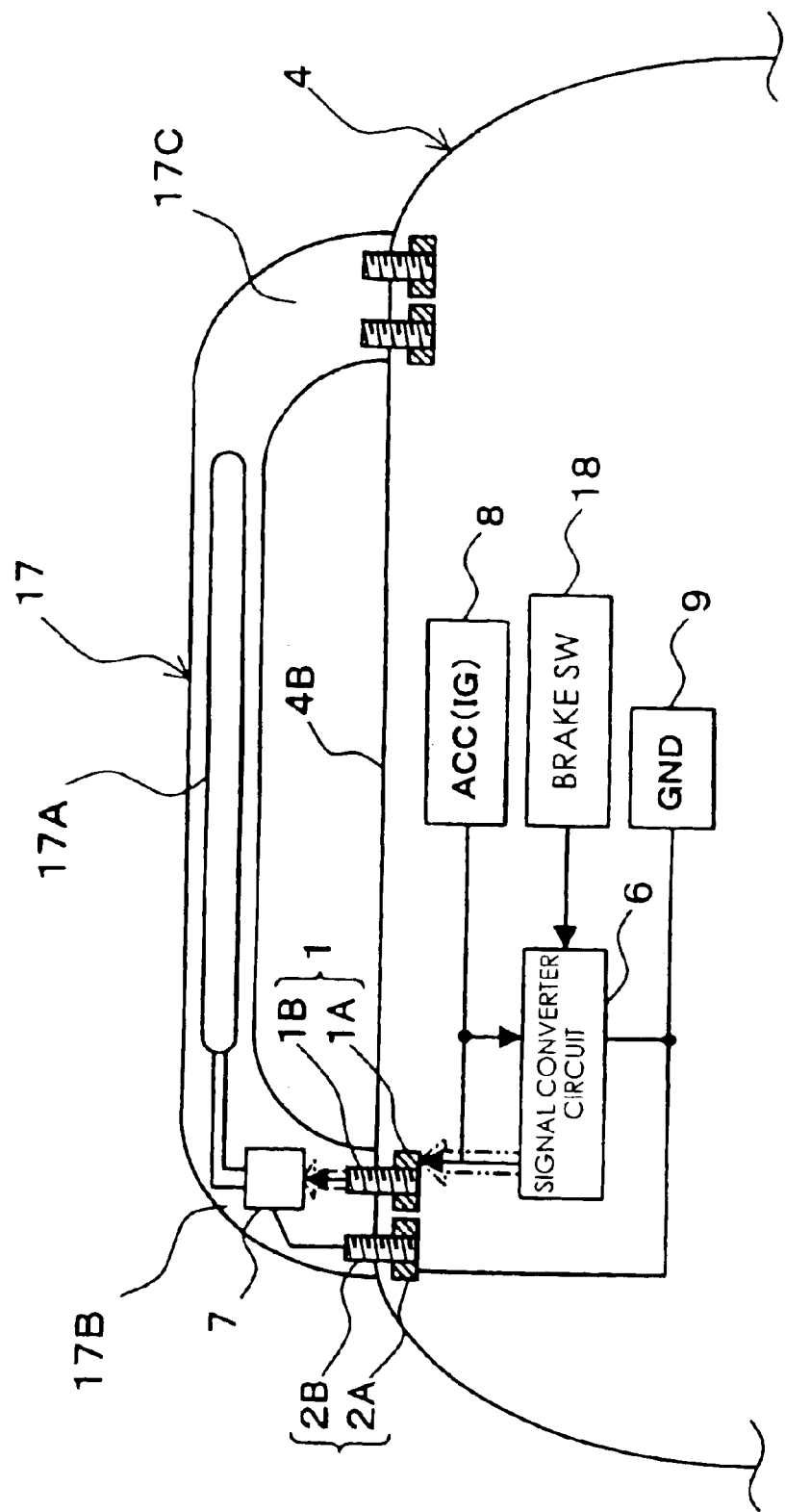
FIG. 4 is a front elevation of a schematically illustrated rear spoiler as another exemplified embodiment of a wiring arrangement for a vehicle exterior component according to the present invention.

Moreover, the wiring arrangement for a vehicle exterior component according to the present invention can be applied to a rear spoiler 17 in which a high mount stop lamp 17A is incorporated as an electric part, as shown in FIG. 4.

The rear spoiler 17 is mounted on a trunk lid 4B at a rear of the vehicle body 4, with one leg portion 17B being fixed by the first bolt-nut pair 1 and the second bolt-nut pair 2, and the other leg portion 17C being fixed by the other two bolt-nut pairs. The rear spoiler 17 is formed of electrically insulating plastic, and two bolts 1B and 2B constituting the mates to two nuts 1A, 2A of the first and second bolt-nut pairs 1, 2 and a reverse signal converter circuit 7 like the reverse signal converter circuit 7 as shown in FIGS. 1 and 2 are inserted together with a wire for establishing connection therebetween in the leg portion 17B.

On the other hand, two nuts 1A and 2A constituting the counterparts to the bolts 1B, 2B of the first and second bolt-nut pairs 1, 2 are provided in the trunk lid 4B of the vehicle body 4, and the two nuts 1A and 2A are connected to a signal converter circuit 6 like the signal converter circuit 7 as shown in FIGS. 1 and 2.

In the vehicle body 4, an ACC (IG) terminal 8 of the ignition switch circuit is connected to the nut 1A in the trunk lid 4B, and to a positive terminal of the signal converter circuit 6, while a negative terminal of the signal converter circuit 6 and the nut 2A are connected to a GND terminal 9 of the ignition switch circuit. To an input terminal of the signal converter circuit 6 is connected an output terminal of a brake switch 18 installed in a driver's seat (not shown), and an output terminal of the signal converter circuit 6 is connected to the nut 1A.

On the other hand, in the rear spoiler 17, the bolt 1B is connected to a positive terminal commonly used as an input terminal of the reverse signal converter circuit 7 provided in the leg portion 17B, and a negative terminal of the reverse signal converter circuit 7 is connected to the bolt 2B. Output terminals of the reverse signal converter circuit 7 are connected to the high mount stop lamp 17A incorporated in the rear spoiler 17.

According to the present embodiment of the wiring arrangement for the rear spoiler 17 as thus described above, the leg portions 17B, 17C of the rear spoiler 17 are fixed onto the trunk lid 4B by the first bolt-nut pair 1, the second bolt-nut pair 2, and two other bolt-nut pairs. The ACC (IG) terminal 8 of the ignition switch in the vehicle body 4 is connected via the first bolt-nut pair 1 to the positive terminal of the reverse signal converter circuit 7 in the leg portion 17B of the rear spoiler 17. The GND terminal 9 in the vehicle body 4 is connected via the second bolt-nut pair 2 to the negative terminal of the reverse signal converter circuit 7 in the leg portion 17B. The output terminal of the signal converter circuit 6 in the vehicle body 4 is connected via the bolt-nut pair 1 to the positive terminal commonly used as the input terminal of the reverse signal converter circuit 7 in the leg portion 17B. Therefore, when the ignition switch is turned to the ACC position or the IG position, the reverse signal converter circuit 7 and the high mount stop lamp 17A in the rear spoiler 17 are securely supplied with power and actuated without fail. Thus, the high mount stop lamp 17A can be lit up in response to the operating signal from the brake switch 18 without fail.

In conclusion, the wiring arrangement for the rear spoiler 17 according to the present embodiment can prevent a defect in electric connectivity such as a break or short circuit, and can reduce the number of assembly steps or man-hours for assembly of the rear spoiler 17.

Although the preferred embodiments of the present invention have been described above, various modifications and changes may be made in the present invention without departing from the spirit and scope thereof. For example, in FIG. 1, the three (first, second and third) bolt-nut pairs 1–3 may be constructed such that the bolts 1B–3B are inserted in the mount 4A, and the nuts 1A–3A are screwed and fitted from a mirror base 5A side.

As described above, with the wiring arrangement for a vehicle exterior component, only fixing the vehicle exterior component to the vehicle body serves to securely connect the electric part incorporated in the vehicle exterior component to the electric circuit in the vehicle body. Consequently, a defect in electric connectivity (e.g., a break and a short circuit) to the electric part that could otherwise occur can be prevented, and the number of assembly steps, and thus man-hours for assembly, of the vehicle exterior component can be reduced.

Further, when the electric part is connected via the first bolt-nut pair to an ACC terminal or an IG terminal of an ignition switch circuit in the vehicle body, and via the second bolt-nut pair to a GND terminal of the ignition switch circuit, the electric part is supplied with power and actuated when the ignition switch is turned to an "ACC" position or "IG" position.

Moreover, when a signal converter circuit for converting an operating signal transmitted to the electric part into a signal having a unique frequency is provided in the vehicle body, and a reverse signal converter circuit for restoring a frequency signal transmitted from the signal converter circuit to the operating signal and transmitting the same to a circuit in the electric part is incorporated in the vehicle exterior component, the signal converter circuit and the reverse signal converter circuit can be connected via the first bolt-nut pair or another (third) bolt-nut pair. In this configuration, the electric part supplied with power when the ignition switch is turned to an "ACC" position or "IG" position can be actuated in accordance with an operating signal received via the third bolt-nut pair.

What is claimed is:

1. A wiring arrangement for a vehicle exterior component, comprising:
   at least one electric part provided in the vehicle exterior component;
   a signal converter circuit provided in a vehicle body and configured to convert at least one operating signal to operate the at least one electric part into at least one respective frequency signal;
   a reverse signal converter circuit provided in the vehicle exterior component and configured to restore the at lest one respective frequency signal transmitted from the signal converter circuit into the at least one operating signal and to transmit the at least one operating signal to the at least one electric part; and
   a plurality of bolt-nut pairs via which the signal converter circuit and the reverse signal converter circuit are connected.

2. A wiring arrangement for a vehicle exterior component according to claim 1,
   wherein the plurality of bolt-nut pairs include a first bolt-nut pair and a second bolt-nut pair,
   wherein the reverse signal converter circuit is connected via the first bolt-nut pair to one of an ACC terminal and an IG terminal of an ignition switch circuit in the vehicle body, and via the second bolt-nut pair to a GND terminal of the ignition switch circuit, and
   wherein the signal converter circuit and the reverse signal converter circuit are connected via one of the plurality of bolt-nut pairs other than the second bolt-nut pair.

3. A wiring arrangement for a vehicle exterior component according to claim 2,
   wherein the plurality of bolt-nut pairs further include a third bolt-nut pair, and
   wherein the signal converter circuit and the reverse signal converter circuit are connected via one of the first bolt-nut pair and the third bolt-nut pair.

4. A wiring arrangement for a vehicle exterior component according to claim 1, wherein a mount for fixing the vehicle exterior component to the vehicle body is made of an insulating material.

5. A wiring arrangement for a vehicle exterior component according to claim 1, wherein surfaces of the plurality of bolt-nut pairs other than portions for establishing electrical connection are made electrically insulated.

6. A wiring arrangement for a vehicle exterior component according to claim 1,
   wherein the vehicle exterior component is a door mirror, and
   wherein a motor-driven circuit including at least one of a mirror angle adjustment circuit, a mirror retracting operation circuit and a mirror deploying operation circuit is incorporated in the door mirror.

7. A wiring arrangement for a vehicle exterior component according to claim 1, wherein the vehicle exterior component is a rear spoiler in which a high mount stop lamp is incorporated.

8. A wiring arrangement for a vehicle exterior component, comprising:
   at least one electric part provided in the vehicle exterior component;
   a signal converter circuit provided in a vehicle body and configured to convert at least one operating signal to operate the at least one electric part into at least one respective frequency signal;
   a reverse signal converter circuit provided in the vehicle exterior component and configured to restore the at least one respective frequency signal transmitted from the signal converter circuit into the at least one operating signal and to transmit the at least one operating signal to the at least one electric part; and
   at least three bolt-nut pairs via one of which the signal converter circuit and the reverse signal converter circuit are connected.

9. A wiring arrangement for a vehicle exterior component according to claim 8,
   wherein the at least three bolt-nut pairs include a first bolt-nut pair, a second bolt-nut pair and a third bolt-nut pair,
   wherein the reverse signal converter circuit is connected via the first bolt-nut pair to one of an ACC terminal and an IG terminal of an ignition switch circuit in the vehicle body, and via the second bolt-nut pair to a GND terminal of the ignition switch circuit, and
   wherein the signal converter circuit and the reverse signal converter circuit are connected via one of the first bolt-nut pair and the third bolt-nut pair.

10. A wiring arrangement for a vehicle exterior component according to claim 8, wherein a mount for fixing the vehicle exterior component to the vehicle body is made of an insulating material.

11. A wiring arrangement for a vehicle exterior component according to claim 8, wherein surfaces of the at least three bolt-nut pairs other than portions for establishing electrical connection are made electrically insulated.

12. A wiring arrangement for a vehicle exterior component according to claim 8,
   wherein the vehicle exterior component is a door mirror; and
   wherein a motor-driven circuit including at least one of a mirror angle adjustment circuit, a mirror retracting operation circuit and a mirror deploying operation circuit is incorporated in the door mirror.

13. A wiring arrangement for a vehicle exterior component according to claim 8, wherein the vehicle exterior component is a rear spoiler in which a high mount stop lamp is incorporated.

* * * * *